Dec. 23, 1941.  M. J. HUGGINS  2,267,102
MEANS FOR CONTROLLING ELECTRICALLY OPERATED APPARATUS
Filed Jan. 5, 1939  6 Sheets-Sheet 1
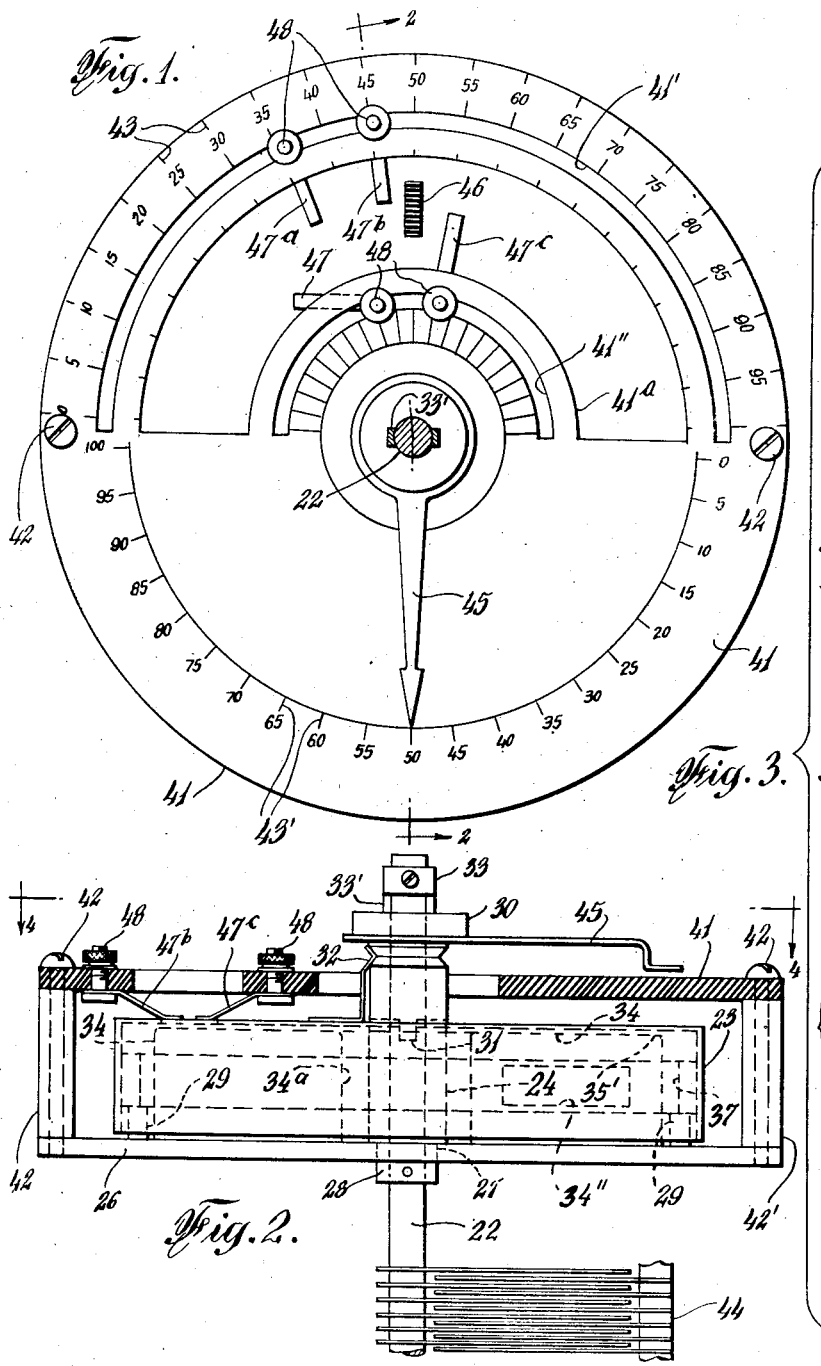
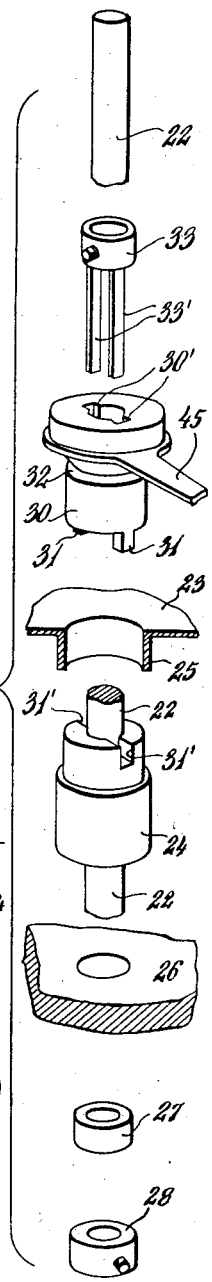
INVENTOR
M. J. Huggins
BY John O. Seifert
ATTORNEY Dec. 23, 1941.   M. J. HUGGINS   2,267,102
MEANS FOR CONTROLLING ELECTRICALLY OPERATED APPARATUS
Filed Jan. 5, 1939   6 Sheets-Sheet 2
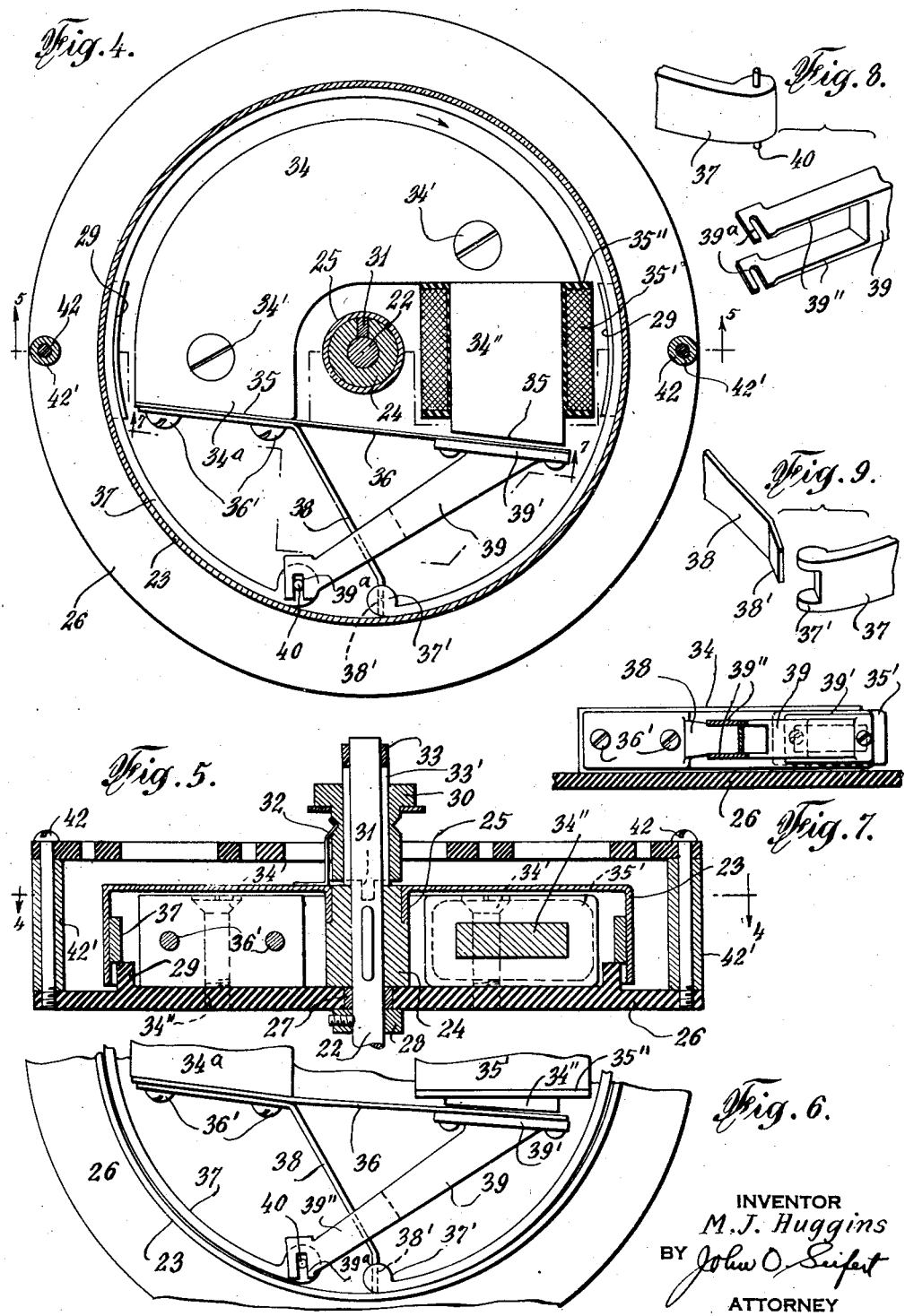
INVENTOR
M. J. Huggins
BY John O. Seifert
ATTORNEY Dec. 23, 1941.   M. J. HUGGINS   2,267,102
MEANS FOR CONTROLLING ELECTRICALLY OPERATED APPARATUS
Filed Jan. 5, 1939   6 Sheets-Sheet 3
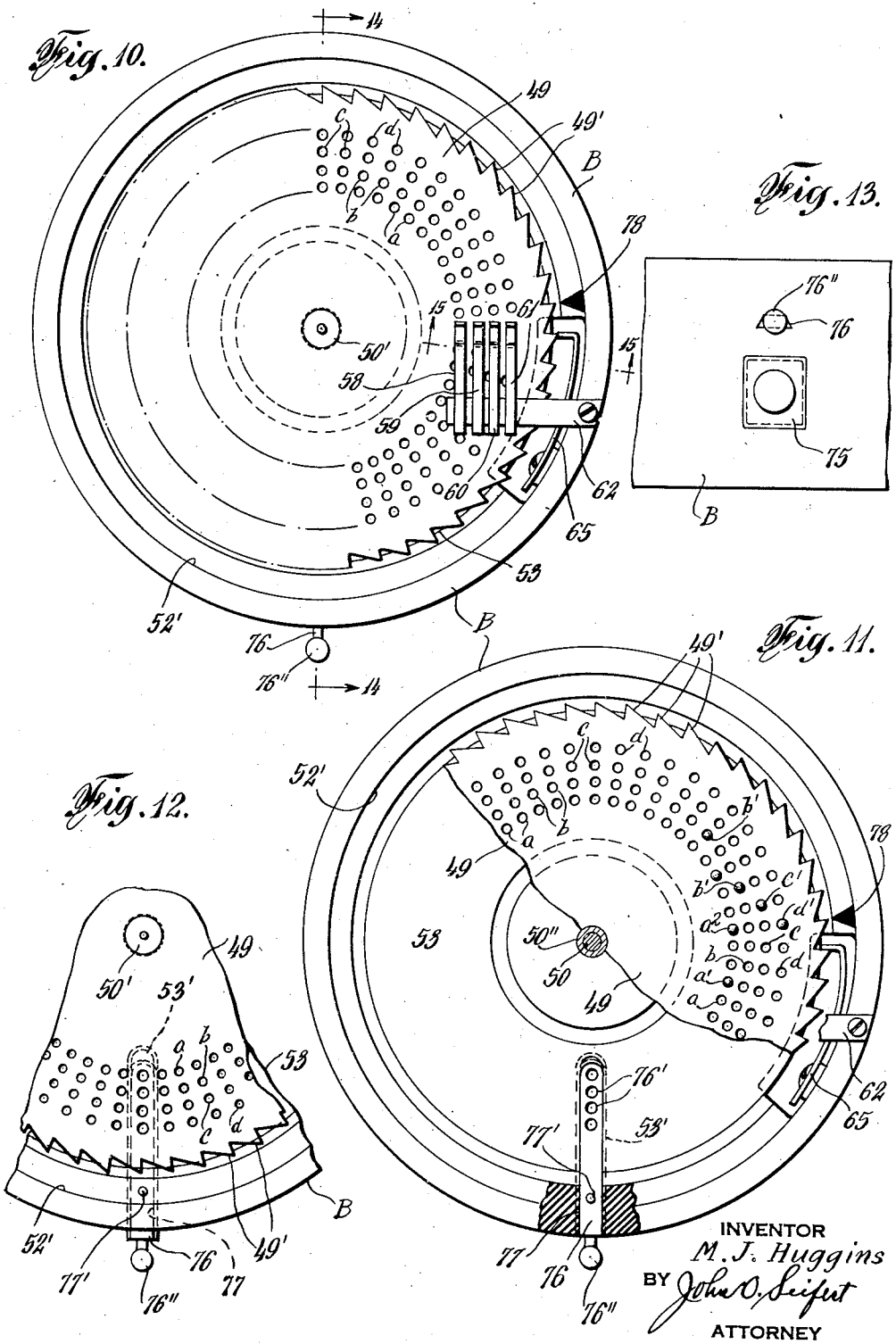
INVENTOR
M. J. Huggins
BY John O. Seifert
ATTORNEY

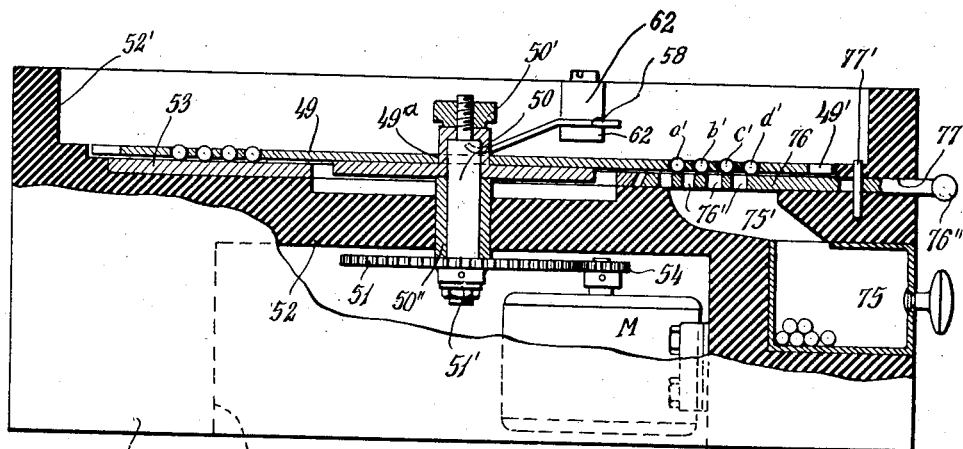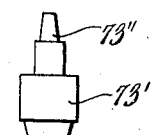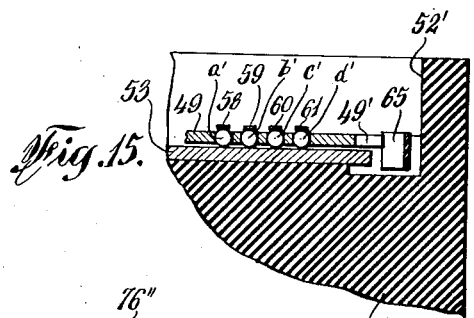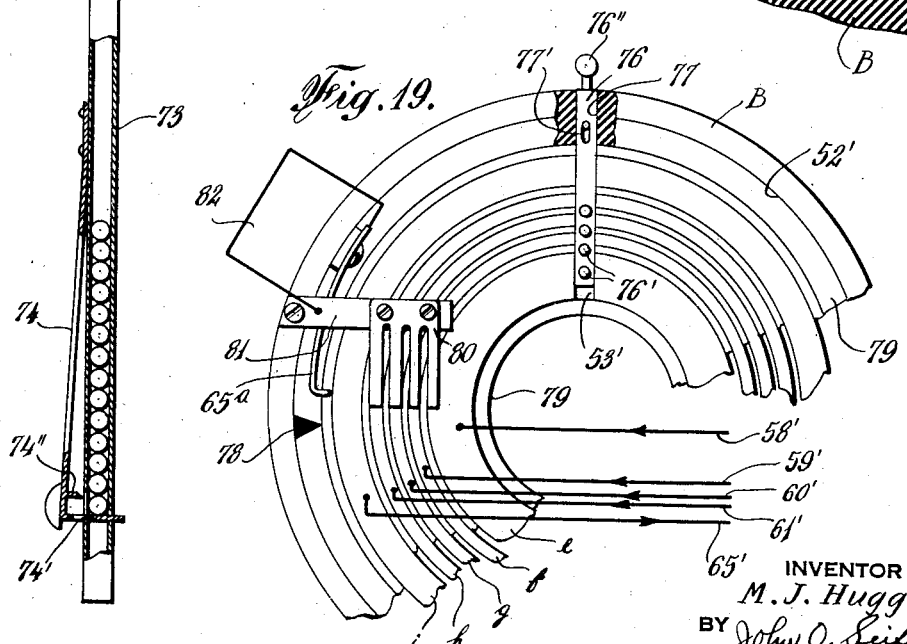

Dec. 23, 1941.  M. J. HUGGINS  2,267,102
MEANS FOR CONTROLLING ELECTRICALLY OPERATED APPARATUS
Filed Jan. 5, 1939  6 Sheets-Sheet 5
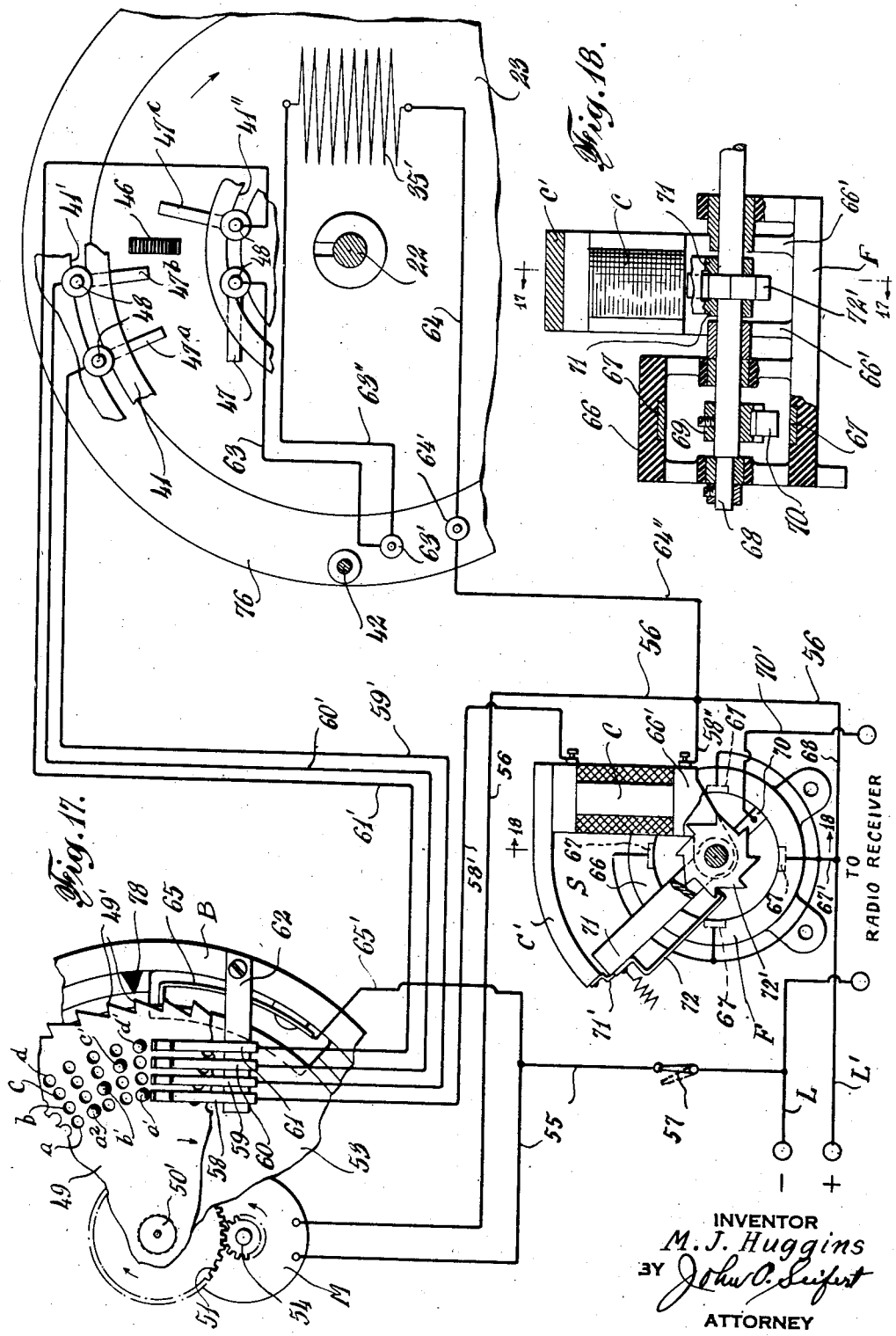
INVENTOR
M. J. Huggins
BY John O. Seifert
ATTORNEY Dec. 23, 1941.   M. J. HUGGINS   2,267,102
MEANS FOR CONTROLLING ELECTRICALLY OPERATED APPARATUS
Filed Jan. 5, 1939   6 Sheets-Sheet 6
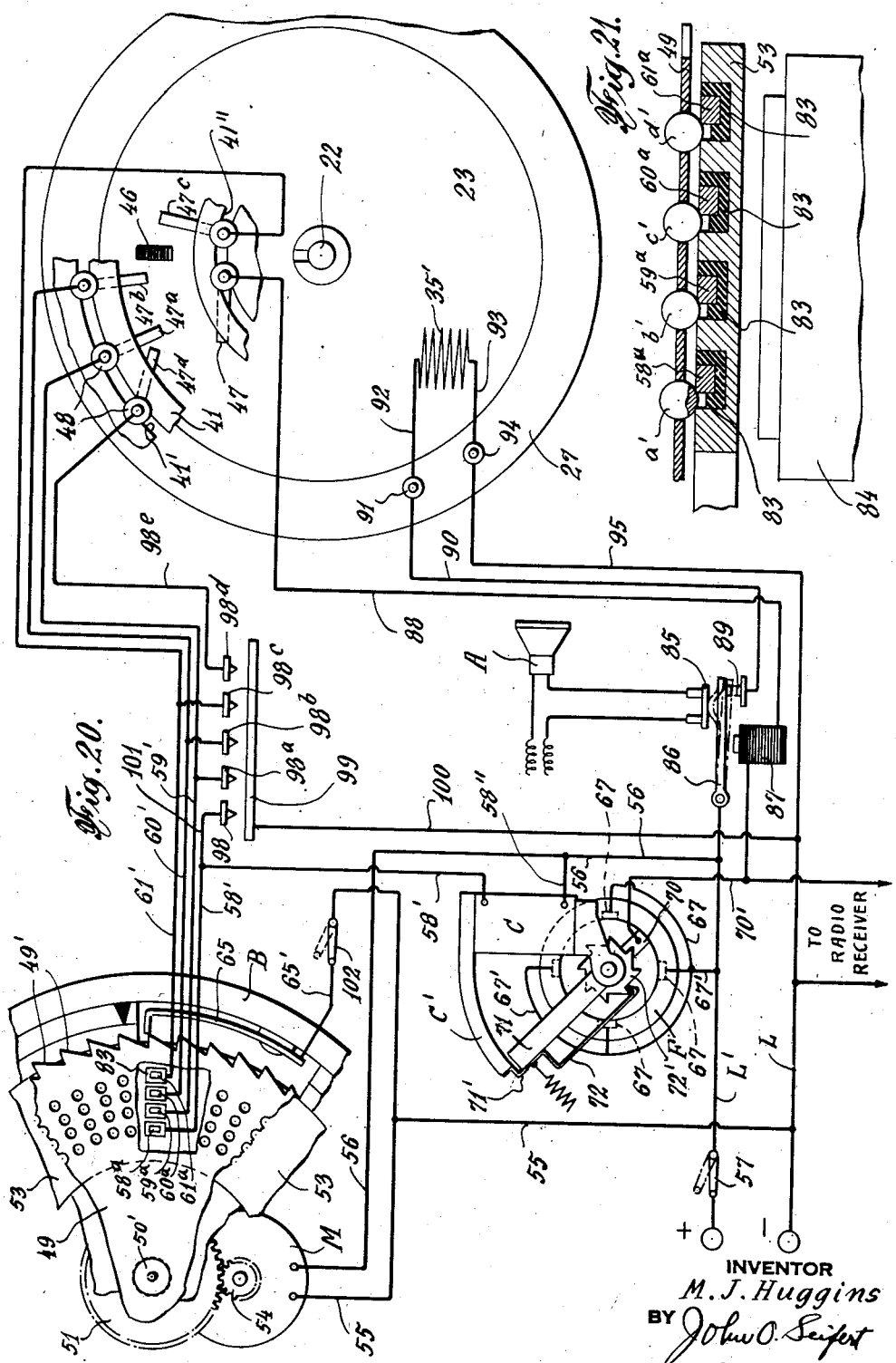
INVENTOR
M. J. Huggins
BY John O. Seifert
ATTORNEY Patented Dec. 23, 1941

2,267,102

UNITED STATES PATENT OFFICE 2,267,102

MEANS FOR CONTROLLING ELECTRICALLY OPERATED APPARATUS

Merion J. Huggins, Upper Saddle River, N. J.

Application January 5, 1939, Serial No. 249,400

14 Claims. (Cl. 172—126)

This invention relates to means for controlling the energization and deenergization of an electric motor and the operation of mechanism actuated by the motor, and while the invention is applicable to and for controlling the operation of different mechanisms operated by an electric motor, it is particularly adapted for controlling the actuation of an element or elements to tune the receiver circuits of a radio receiver into consonance with different radio frequencies.

It is an object of the invention to provide new and improved means for preselecting and controlling the starting and stopping of an electric motor and actuation of mechanism operated thereby at selected predetermined successive intervals.

It is another object of the invention to provide new and improved selectively settable means automatically operative to effect and control the energization and deenergization of electric operating means and the operation of mechanism actuated thereby in accordance with selected predetermined schedules.

It is another object of the invention to provide new and improved selectively settable and selectively operable means automatically and selectively operative for effecting energization and deenergization of an electric motor and actuation of a rotor and adjoined circuit breaking means and adjustment of tuning means of a radio receiver connected to and actuated by said rotor and motor to tune the radio receiver circuits into consonance with different preselected radio frequencies at successive selected predetermined intervals and maintain the radio receiver tuned in circuit with a preselected radio frequency for a selected predetermined interval and to stop and hold the rotor of said motor and the tuning means against movement in radio frequency tuning position and release the rotor and tuning element when the motor is energized.

A further object of the invention relates to improved electrically operated means including a rotor adapted to be connected to and rotatable coordinately with the rotation of a tuning element or elements of a radio receiver, and electrically vibratable means connected to means cooperating with the rotor to stop and normally hold the rotor and tuning element against movement and operative by the vibratable means to release the rotor and tuning element and transmit the vibrations of the vibratable means to said means to rotate the rotor and tuning element to tune the radio receiver circuits into consonance with different radio frequencies. A further object is to provide selectively settable and selectively operable means operative for rendering said electrically operated means active at predetermined intervals to release and actuate the rotor and tuning means and close the circuit of the radio receiver at preselected intervals and open the power circuit of the radio receiver at selected predetermined intervals.

Other objects and advantages of the invention will hereinafter appear.

In carrying out the invention there is provided a rotor member disclosed as a disc and constituting a rotatable electric conductor having an electric circuit breaker, said disc being provided with an adjoined flanged portion. The disc with its flanged portion constitutes what is herein termed a flanged or cup-shaped rotor which is operatively connected to means to be actuated thereby by mounting the same upon a shaft, which may constitute the condenser shaft of a radio receiver when the invention is to be used as a radio tuning means. In this case means is provided to releasably couple the rotor to the shaft and arranged as a manipulating hand knob to rotate the shaft independently of the rotor, the knob carrying a pointer to be moved thereby relative to graduations arranged on an indicator dial concentric of the rotor. The rotor and connected mechanism is actuated by suitable electrically operated means, such as a motor, and shown as comprising means including an oscillatory resilient band within the rotor yieldingly anchored at one end, as on the support for the shaft. The band, under the expansive forces thereof, engages the flange of and holds the rotor against rotation, the band being adapted to be contracted and expanded and arcuately oscillated to thereby release and transmit rotary movement to the rotor. The resilient band is caused to be contracted and expanded and arcuately oscillated by electromagnetically operated vibratable means connected to the free end of the resilient band. Selectively settable circuit closing and opening means is provided for the electrically operated means to cause the electrically operated means to actuate the rotor and connected mechanism at successive predetermined intervals and effect preselected actuation of the mechanism, and when the actuated means constitutes the tuning means of a radio receiver, to preselectively tune the receiver, effect the actuation of means to open the circuit of an audio amplifier during the tuning period and when the receiver has been tuned to close said circuit, as well as close the circuit of the receiver and open said circuit after a predetermined operation of the receiver.

For the above purposes, the rotatable conductor member is electrically connected in one side of the electromagnetic vibratable means with contacts contacting the conducting member adjustably mounted on the indicator dial in predetermined spaced relation to the electric circuit-breaking means, in this instance, a non-conducting space in said conductor member. A plate of di-electric material travelling at a constant speed is provided with a series of rows of openings or perforations adapted for the selective engagement of circuit makers to contact with and be transported by the dielectric plate relative to a fixed conductor electrically connected in the opposite side of the electromagnetic vibratable means and disposed at one side of the dielectric plate. A series of contact makers, one disposed relative to each row of openings in the dielectric member and connected to a contact contacting the rotor are adapted to be contacted at selected predetermined intervals by the circuit makers as they are transported by the dielectric plate and establish a circuit through preselected contacts contacting the rotor and effect predetermined rotation of the rotor and tuning of the radio receiver predetermined by the adjustment of the contacts relative to and opening the circuit by the non-conducting space in the rotor contacting the contact through which the circuit is closed.

In the drawings accompanying and forming a part of this application:

Figure 1 is a front elevation of the rotor constituting a conductor member showing a dial in relation thereto and contacts mounted thereon contacting said conductor member and an indicator pointer movable relative to the dial.

Figure 2 is a sectional view taken on the line 2—2 of Figure 1 and showing a radio receiver condenser shaft in connection therewith.

Figure 3 is a perspective view of the component parts to releasably couple the rotor to its supporting shaft and showing the parts in disassembled relation.

Figure 4 is a sectional view taken on the line 4—4 of Figure 5.

Figure 5 is a sectional view taken on the line 5—5 of Figure 4.

Figure 6 is a view of the lower portion of Figure 4 showing the parts in another position.

Figure 7 is a sectional view taken on the line 7—7 of Figure 4.

Figure 8 is a perspective view of an end portion of the resilient band and the means to connect it to the vibratable means, the parts being shown in disassembled relation.

Figure 9 is a perspective view of the other end portion of the resilient band and the means to anchor the same, the parts being shown in disassembled relation.

Figure 10 is a plan view of the selectively settable circuit closing and opening means.

Figure 11 is a view similar to Figure 10 with a portion of the dielectric plate for carrying the circuit makers broken away to show means for permitting delivery of the circuit makers from the openings in the dielectric plate.

Figure 12 is a fragmentary plan view of the selectively circuit closing and opening means and showing the means for permitting delivery of the circuit makers from the openings in the dielectric plate in another position.

Figure 13 is a bottom plan view of Figure 12.

Figure 14 is a sectional view, on an enlarged scale, taken substantially on the line 14—14 of Figure 10.

Figure 15 is a sectional view, on an enlarged scale, taken on the line 15—15 of Figure 10.

Figure 16 is a longitudinal side elevation, partly in section, of means for engaging the circuit makers in the openings in the dielectric plate.

Figure 17 is a diagrammatic view of the electrical connections of the selectively settable circuit closing and opening means with the electrically operated means and having connected therein means operative to close and open the power circuit of the radio receiver, a portion of said figure being taken on the line 17—17 of Figure 18.

Figure 18 is a sectional view of the means to close and open the power circuit of the radio receiver taken on the line 18—18 of Figure 17.

Figure 19 is a plan view of a portion of the selectively settable circuit closing and opening means showing a modified embodiment of the same.

Figure 20 is a view similar to Figure 17 showing a modified arrangement of the contact makers of the selectively settable means and having connected therein means for controlling the circuit of an audio amplifier of the receiver together with means for effecting manual operation of the circuit closing means to effect preselected operation of the electrically operated means and tuning of the radio receiver and non-predetermined operation of the electrically operated means and tuning of a receiver; and Figure 21 is a sectional view of the conductor member of the selectively settable means of Figure 20 to show the arrangement of contact makers and showing an electromagnet connected in the circuit thereof to cause the circuit makers to contact the contact makers and conductor member.

In the embodiment illustrated, the invention is shown as applied to the condenser shaft 22 of a radio receiver to effect preselected tuning of said receiver. A rotor in the form of a cup shaped member 23 of electric conducting material is fixed on a hub member 24 of dielectric material by engaging a flange disposed about an axial opening in the rotor upon an end of reduced diameter of the hub member, as at 25. The hub member extends into and is of slightly greater length than the depth of the rotor, the hub being loosely mounted on the shaft 22 in abutting relation to a fixed plate of dielectric material 26 through which the shaft is extended and rotatably supported in a bushing 27. The shaft is held against axial movement in one direction by a collar 28 secured thereon at the side of the plate opposite the hub member 24. The open end of the rotor is disposed relative to the plate 26 with a projection or projections 29 on the plate extending into the rotor.

Means are provided to releasably connect the rotor to the shaft to rotate therewith and permit rotating the shaft independently of the rotor, and shown in Figures 2, 3 and 5 as comprising a coupling member in the form of a tubular member 30 of dielectric material engaged on the shaft and having a portion of enlarged diameter at the outer end to constitute a finger engaging knob. At the opposite end it is provided with diametrically opposite alined projections 31 adapted to engage in corresponding recesses 31' in the end of the hub member 24 to couple the rotor to the shaft and retained in coupled relation by a resilient detent fixed to the rotor arranged at the free end to offset V shape and slidably engaging in a correspondingly formed annular groove in the coupling member, as at 32. To permit the coupling member 30 to rotate with and have sliding movement on the shaft it is provided with diametrically opposite longitudinal recesses 30' and a collar 33 on the shaft 22 is provided with diametrically opposite splines 33' engaging the recesses 30' in the coupling member with the splines abutting the hub member 24 and being of greater length than the coupling member, the spline carrying collar being secured to the shaft by a set screw. as shown, to rotate with the shaft. It will be obvious that by exerting an outward force on the coupling member 30 it will be released from the detent 32 and disengaged from the hub member 24 and the shaft may then be rotated by the coupling member due to the spline connection of the same with the collar 33.

Electrically operated means or a motor are provided to rotate the rotor and connected mechanism, shown as electromagnetically vibrated means, mounted upon the support 26 within the rotor, comprising a yoke member 34 of magnetizable material mounted upon the support 26 by means of screws 34' passing through openings in the yoke member and threaded into the support. The yoke has an arcuate peripheral surface the radius of which is less than that of the flange of the rotor whereby the yoke member is spaced from the rotor flange, as clearly shown in Figure 4. The legs of the yoke member are arranged to extend to one side of the axis of the rotor when the yoke member is mounted on the support, and the ends of the legs are inclined at an acute angle to the horizontal, as shown at 35. One of the screws 34' is extended through one leg of the yoke member and the other screw extended through the yoke member adjacent the juncture of the other leg with the arcuate portion of the yoke member and said leg reduced in cross section to substantially oblong form, as shown at 34" in Figure 5. A coil 35' wound around a carrier 35" is engaged upon the leg 34" constituting the core of the coil and is of greater length than the coil, the coil being adapted to be connected in the circuit of an alternating electric current.

The electromagnet is adapted to vibrate the vibratable means in synchronism with the pulsations of the electric current flowing through the coil 35'. The vibratable means is shown as comprising a reed or plate 36 of resilient magnetic material to serve as armature to the core 34", the plate as shown being secured at one end by means of machine screws 36' to the end of leg 34a of the yoke member 34, which leg is of slightly greater length than the other leg or core 34". The free end of the plate 36 normally extends in parallelism to but out of contact with the end of the core 34" in the field of the pulsating magnetic flux at the end of the core 34" generated by the electric current flowing through the coil and effecting an intermittent attraction of the free end of the plate toward the core against the tension of the plate and yieldingly moved away from the core by the tension of the material of the plate and thereby setting up a rapid vibration of said free end.

The vibrations of the reed 36 are transmitted to and converted into slight arcuate rotary movement of a band of resilient material 37 and into rotary movement of the rotor 23 in one direction. The said band 37 of resilient material is disposed within the flange of the rotor with the ends arranged in spaced relation below the legs of the yoke member 34, as shown in Figure 4, and normally frictionally engages said flange under the expansive forces of the band. The band is yieldingly anchored and supported at one end by a plate 38 of rigid though yielding material fixed at one end to the end of the leg 34a of the yoke member in contiguous relation to the plate 36 by the plate securing screws 36'. The free end of the plate 38 is arranged to extend at an acute angle to the plate 36 with the extremity offset laterally, as at 38', and engaging in a bifurcation 37' in an enlargement at one end of the band 37, this connection of the plate 38 with the band 37 permitting of slight endwise or oscillatory movement of the band.

The opposite end of the band 37 is supported and operatively connected to the free end of the plate 36 by a rigid arm 39 having a base portion 39' at one end secured to the free end of the plate 36 in opposed relation to the end of the core 34", the arm 39 inclining from the base portion inwardly from the end of and at an acute angle to the plate 36, in a direction opposite to the inclination of the anchor plate 38. The arm 39 has a bifurcation 39" at the end for the passage of plate 38 with the bifurcation legs engaging at the opposite edges of said plate and is connected to the end of the band 37 opposite the end 37' to have pivotal and sliding movements by the opposite ends of a pin 40 extended through an enlargement at said end of the band engaging alined angular recesses 39a extended inwardly from an edge of the bifurcation legs, as clearly shown in Figures 4 and 8. The band 37 is of less width than the rotor flange and is retained in position by the projections 29 on support 26.

In the inactive condition of the electrically operated means or motor the parts assume the position shown in Figure 4 with the band 37 engaging the annular flange of the rotor under the expansion forces of the band and frictionally holding the rotor against rotation in either direction. In this position the band is held snugly against the annular flange of the rotor by a slight pressure of the yielding member 38 bearing upon the free end 37' of the band and exerting an expansion force on the band. Any forces acting on the ends of the band and causing the band to expand will cause it to be frictionally locked to the annular flange of the rotor, while any forces tending to contract the band will cause the band to be unlocked from the annular flange and release the rotor.

When an alternating or pulsatory electric current is caused to flow through the coil of the electromagnet, a pulsatory electric flux is generated and causes the vibratory member to vibrate to and fro in synchronism with the variations in the electric current and flux. As the magnetic flux decreases, the resiliency of the vibratory member causes it to be moved away from the core 34", and as the magnetic flux again increases, the vibratory member is caused to move in a direction toward said core and this action continues in synchronism with the variations of the electric current and electric flux. The arm 39 through its connection 39a, 40 with the one end of the band 37, and being rigid and made an integral part with the free end of the vibratory member 36, will cause movement of said end of the band corresponding with the movement of the vibratory member. The flexing of the vibratory member 36 in a direction towards the core will, therefore, cause the band 37 to be contracted and released from the flange of the rotor and bodily displace the entire band endwise in counterclockwise direction until the vibratory member 36 assumes its fully flexed position. As the vibratory member commences to move in a direction away from the core 34" under the resiliency thereof, the band 37 is urged to expand thereby frictionally locking it to the annular flange of the rotor. In this position of the parts, as the vibratory member is reflexed under the resiliency thereof, said movement of the vibratory member is transmitted to the band and the rotor is locked thereto and rotates through a slight arc in clockwise direction. The vibratory member is vibrated in rapid succession, thereby alternately releasing the band from the flange of the rotor and shifting the band in one direction, and then frictionally locking the band to the rotor and shifting the band with the rotor locked thereto in the opposite direction, resulting in a series of rapid short movements of the rotor in clockwise direction.

A dial in the form of a disk 41 is mounted on the supporting plate 26 to be disposed in front of and spaced from the rotor by screws 42 extended through openings in the disc and tubular spacers 42' interposed between the disc and plate 26 and threaded into the plate. The dial is provided with an enlarged central opening for the passage of the coupling member 30 and is arranged with two series of like graduations 43, 43' extending through an arc of substantially 180 degrees and are indicative of tuning positions of the condenser 44 of the radio receiver. A pointer 45 is fixed on the coupling member 30 and movable therewith relative to the dial graduations.

Means are provided to effect automatic and predetermined starting and stopping of the motor or electrically operated means and the rotor at selected predetermined successive and equal or varying intervals and effect preselected actuation of the rotor and thereby of the tuning means and tuning of the radio receiver. For this purpose the rotor, in the present instance, constitutes an electric conductor with associated means to break the electric circuit of the electrically operated means, the circuit breaking means being shown for illustrative purposes as a non-conducting space, shown as a member of dielectric material inserted in the disc portion of the rotor, as at 46, and a series of contacts, shown as four in number, 47, 47ᵃ, 47ᵇ and 47ᶜ, although a greater number may be used, contacting and adapted to be each connected with the rotor conductor member 23 in one of a plurality of circuits with the electrically operated means for the rotor. The contacts are in the form of spring fingers mounted on the dial 41 to have selective adjustment relative to the non-conducting space 46 and each other and are adapted for connection of electric conductors by means of binding posts or screws 48 extended through slots 41' and 41" in the dial, the dial preferably being of dielectric material. The contacts 47ᵃ, 47ᵇ extend radially inward and the contacts 47, 47ᶜ extend radially outward from the slots relative to a cutout portion 41ᵃ of the dial, and the contact 47 is positioned so that it will not be contacted by the circuit breaker or non-conducting space 46.

To close the circuit for the electrically operated means for the rotor through preselected ones of the contacts and the rotor conductor member, which circuits are opened or interrupted by the electric circuit breaker or non-conducting space 46 of the rotor contacting the contact through which a circuit is closed by the rotation of the rotor, selectively settable means are provided. As shown in Figures 10, 11, 12, 14 and 17, this means comprises a member in the form of a dielectric disc 49 mounted on an axial offset portion of a mounting member to rotate therewith, as at 49ᵃ, loosely engaged on the end of an arbor 50 with a threaded reduced portion of the arbor extending through an opening in the end of said offset portion. The disc is secured to the arbor so as to rotate therewith by a nut threaded onto the threaded portion of the arbor and clamping the mounting member with the disc to the shoulder formed by the reduced threaded portion, as at 50'. The arbor is rotatably mounted in a bearing 50", and a gear 51 is secured on the opposite end of reduced diameter of the arbor in abutting relation to the end of the bearing by a pin and nut, as at 51', the bearing 50" being mounted in a wall 52 separating circular recesses 52', 52" in the opposite faces of a base block B. The disc 49 is arranged in juxtaposed relation to and slightly spaced from an electric conductor member in the form of an annular plate 53 mounted in a reduced portion of the block recess 52' concentrically of and relative to which plate the dielectric disc 49 rotates with the arbor 50.

The disc 49 has a series of radially spaced circular rows of openings or perforations, shown as four in number, a, b, c and d, although they may be greater in number, with the openings of adjacent rows arranged in radial relation, each row including forty-eight equidistantly spaced openings and the spacing of the openings being representative of an interval of fifteen minutes. Members of electric conducting material herein termed circuit makers, and shown as consisting of balls of conducting material, as shown at a', b', c' and d' in Figures 11 and 17, are adapted to be selectively engaged in the disc openings relative to each other in a row and relative to the balls in the other rows, the balls being transported with the disc by the rotation thereof supported in electrical contact with and relative to the conductor member 53. The disc 49 is rotated at a constant speed to impart one revolution to the disc in an interval of twelve hours from a suitable source of power, and shown as driven from a motor M, which may comprise an electric motor, operatively connected to the disc by a pinion 54 on the motor shaft meshing with the gear 51 and connected, as shown in Figure 17, by conductors 55, 56 in circuit with conductors L, L' from a source of electric energy controlled by a switch 57 interposed in the conductor 55. The circuit making balls are adapted to establish electric circuits at successive intervals predetermined by the setting of the balls in the disc openings and brought into contact by the rotation of the disc with contact makers 58, 59, 60 and 61 in the form of resilient fingers mounted on a support 62 of non-conducting material mounted on the base block B to position the fingers in spaced relation above the disc 49 and each in line with a row of openings whereby as balls in the openings pass below said contact makers they will contact therewith.

The contact makers 59, 60, 61 are connected by electric conductors 59', 60', 61' to the contacts 47ᵃ, 47ᵇ, 47ᶜ, respectively, contacting the rotor 23, as shown in Figure 17. Each circuit making ball as it contacts a contact maker 59, 60 or 61 electrically is connected to one side of the coil 35' of the electromagnetically operated vibratable means through contacts 47ª, 47ᵇ or 47ᶜ, conductor or cup-shaped member 23, contact 47, by conductor 63 to binding post 63', conductor 63'' connected to said binding post and a terminal of the coil 35', conductor 64 leading from the opposite terminal of said coil connected to binding post 64' and a conductor 64'' connected to said post and lead-in conductor L' to the positive side of the source of electric energy. The contact maker 58 is electrically connected by conductor 58' with one terminal of a coil of an electromagnet C, the other terminal of which coil is connected by conductor 58'' to conductor 56 connected to the negative side of the source of electric energy, the electromagnet being operative to actuate a switch S, to be hereinafter described, to close and open a circuit, such as the power circuit of a radio receiver.

The circuit making balls and thereby the coil 35' of the electromagnetically vibratable means is connected to the opposite or positive side of the source of electric energy through the conductor member 53 by a circuit maker in the form of a spring 65 (Figs. 10, 11 and 17) mounted at one end on the base block B to extend tangentially of the periphery of the disc 49 and periphery of the conductor member 53, the free end of the circuit maker being flanged laterally and adapted to engage the periphery of the conductor member 53 and electrically connected by conductor 65' to the conductor 55. To cause the circuit maker 65 to make quick contact with the conductor member 53 and establish a circuit substantially simultaneously at the time a circuit making ball contacts a contact maker 58, 59, 60 or 61, the dielectric disc 49 is provided with peripheral teeth 49' equal in number to the openings in each row of the openings in the disc. One face of the teeth extends radially of the disc and the other face of the teeth extends at an oblique angle thereto with the bases of the teeth arranged substantially in radial alinement with the ball circuit makers.

The conductor member 53 is arranged so that the periphery intersects the tooth spaces intermediate the bases and apices thereof, whereby as the disc is rotated the inwardly turned end of the circuit making finger 65 will ride up the oblique face of a tooth and off from said tooth into engagement with the periphery of the conductor 53. The circuit making finger 65 will remain in contact with the conductor 53 until the rotor 23 has been rotated sufficiently to contact the non-conducting space 46 with the contact through which the circuit is closed when the circuit maker 65 is moved out of contact with the conductor member 53 by riding up the oblique face of a succeeding disc tooth. Should no circuit making ball be in contact with a contact maker 59, 60 or 61 when the circuit maker 65 rides off from a disc tooth into contact with the conductor member 53 no circuit will be established. The contact maker 58, in conjunction with the circuit maker 65, is adapted to actuate the switch S at selective intervals to open and close the power circuit radio in sequence.

The switch S, as shown in Figures 17 and 18, comprises a bracket F of dielectric material having laterally extending perforated ears for the engagement of screws for mounting the bracket on a support. The bracket has a cylindrical portion 66 having conductor members 67 mounted in and equidistantly spaced about the inner surface thereof and electrically connected by a conductor 67' in series with the conductor L'. A shaft 68 is journaled centrally of the cylindrical member 66 of the bracket F. A member 69 of non-conducting material is fixed on the shaft within the cylindrical portion 66 to rotate in the plane of the conductor members 67 and carries a contact maker 70 successively actuated by the rotation of the shaft 68 into and out of contact with the contact makers 67, the contact maker 70 being connected by conductor 70' to the positive side of the power circuit of the radio receiver. To impart intermittent movement to the contact carrier 69 through an arc of 45 degrees to successively place the contact maker 70 into and out of contact with a conductor 67, the core of the electromagnet C is provided with a lateral extension C' arranged in an arc of a circle substantially concentric to and spaced from the cylindrical portion 66 of the bracket. The core is carried by arms 66' extending from the base of the bracket F in which the shaft 68 is rotatably supported.

The armature 71 of the electromagnet C has a bifurcation at one end with perforations in the bifurcation legs whereby it is pivotally supported upon the shaft between the bracket arms 66' to have movement toward and away from the coil C and moved toward said coil when the coil is energized and normally assuming a position away from the coil in engagement with a stop 71', shown as connected to one end of the core extension. The oscillatory movement of the armature is transmitted to intermittent rotary movement of the shaft to position the contact 70 successively into and out of contact with a conductor member 67 by a resilient pawl 72 co-operating with a ratchet wheel 72' fixed on the shaft 68 within the bifurcated end of the armature. As stated, one terminal of the magnet coil C is connected by the conductor 58'' to the conductor 56 and the opposite terminal is connected by conductor 58' to contact maker 58. The circuit of the electromagnet C is closed and opened by ball circuit makers a' in the row of openings a in the disc 49 contacting the contact 58, which is predetermined by the setting of the ball circuit makers in said openings, and the circuit maker 65 contacting the conductor member 53 and conductors 65', 55.

A suitable implement is provided to facilitate engaging the ball circuit makers in the openings in the disc 49, and shown in Figure 16 as comprising a tubular member 73 open at one end and provided with means to eject the balls individually from the open end. This implement is shown as a strip 74 of resilient material fixed at one end to the side of the tube intermediate the ends to extend toward the open end of the tube and arranged so that the free end normally assumes a position away from the tube. The free end is flanged laterally and slidably engages an opening in the tube to have movement transversely thereof and has an opening therein, as shown at 74', an unperforated portion of which flange in the normal position of the strip extends transversely of the tube bore and serves as a support for and prevents the balls from passing outward from the end of the tube. By moving the strip toward the tube the opening in the strip flange is placed in register with the tube bore permitting the balls to pass through the flange opening. Simultaneously with registering the flange opening with the tube bore, a projection 74'' extended laterally from the strip in parallelism with the flange, but of less length than the flange, is caused to be engaged in the tube and engage in front of the ball succeeding the end ball and assuring the delivery of only one ball from the tube. A closure cap 73' has a removable connection with the opposite end of the tube to facilitate filling the tube with the balls. The cap is provided with an insert 73" of permanently magnetized material adapted to attract thereto and remove a ball inserted into a disk opening. To engage or insert balls into the openings in disk 49 the open end of the tube is placed in register with the desired opening in the disk in which a ball is to be engaged when the ejector strip 74 is pressed inwardly toward the tube thereby permitting a ball to be delivered from the tube into said opening.

To displace the ball circuit makers from the disk 49 the base block B is provided with a recess in the side in which a drawer 75 is slidably engaged, as shown in Figure 14, the drawer having an opening in the top adapted to register with the outlet of a passage 75' communicating with the block recess 52' and the opening in the top of the drawer, and an inlet disposed below the conductor member 53 in line with and of a length slightly greater than the radial row of openings in the disk 49. A slide 76 is slidably engaged in a slideway 77 in the block B in the plane of the conductor member 53 and constitutes a continuation of a radial recess 53' in said conductor, as shown in Figures 12, 13 and 14. The slide 76 has a series of openings 76' spaced longitudinally thereof and corresponding to the radial spacing of the openings in the disk 49, and has a manipulating knob 76" at the end projecting from the block adapted to be grasped to impart inward and outward movement to the slide, which movement is limited by a pin in the block engaging a recess in the slide, as at 77'.

In the normal position of the slide 76 the wall portions between the openings are in line with the rows of openings in the disk 49 and are adapted to be engaged by the balls in the disk openings as they are transported by the disk relative to the slide, as shown in Figures 11 and 14. By moving the slide 76 to the limit of its movement outwardly from the base block B, as shown in Figure 12, the openings in the slide are registered with radially alined openings in the disc 49, and as the balls inserted in the openings in and transported by the disc are positioned in register with the slide openings the balls will pass from the disc openings into and through the slide openings into the passage 75' and from the latter into the drawer 75.

The selective setting of the circuit closing means and operation is substantially as follows: The selectively settable means is shown for illustrative purposes to effect actuation of the rotor 23 and tuning element at three selected intervals to tune the receiver circuits to oscillate at and in resonance with three different preselected radio frequencies, and to close and open the power circuit of the receiver at selected predetermined intervals. The settable circuit closing means may be set to commence operation at any period of time and automatically operative to close the circuit of the electrically operated means or motor to actuate the tuning means and tune the receiver at fifteen minute or a multiple of fifteen minute intervals. Assuming it is desired to set the circuit closing means to close the power circuit maker and render the receiver active at two o'clock, for instance, a ball circuit maker a' is engaged in an opening in the row of openings a. To effect operation of the electrically operated means and preselected tuning of the receiver at successive fifteen minute intervals, balls b', c' and d' are inserted in the openings in the rows of openings b, c and d. For illustrative purposes, as shown in Figure 17, a ball d' has been inserted in an opening d in radial alinement with the ball a', a ball c' is inserted in an opening c and a ball b' in an opening b whereby to effect tuning at successive fifteen minute intervals. A further ball $a^2$ (Figs. 11 and 17) is engaged in an opening a to effect opening of the power circuit of and render the receiver inactive after a further successive fifteen minute interval.

After the balls have been inserted in the disc openings, as described, the disc is released from the arbor 50 by unscrewing the nut 50' from the arbor. The disc is then manually rotated until a radial line of openings in disc 49 is in radial alinement or in register with an indicator 78 on the base block B, (Figure 14), when the nut 50' is screwed onto the arbor to clamp the disc thereto. In this position of the disc the balls in openings a and d will be positioned slightly rearwardly of the contact makers 58, 59, 60 and 61, the disc being rotated in the direction indicated by the arrow shown in Figure 17. The circuit closer 57 is then actuated to connect the motor M in circuit with the source of electric energy. As the disc is rotated by said motor and the ball a' contacts the contact maker 58 simultaneously therewith, the circuit maker 65 will ride off a disc tooth 49' and contact the periphery of the conductor 53, thereby closing a circuit through the electromagnet C through conductors 65', 55, and 58', 58" and L'. Energization of the electromagnet C and movement of the armature 71 in a direction toward the electromagnet and through its pawl and ratchet connection 72, 72' with the shaft 68 will rotate said shaft and move the contact terminal 70, which is positioned between a pair of contact terminals 67, in contact with one of said contacts 67 and close the power circuit of the receiver through conductors 67', 70'. Simultaneously with the ball a' contacting the contact maker 58, ball d' contacts contact maker 61 connecting the coil 35' of the electromagnetically operated means to rotate the rotor 23 in circuit with the source of electric energy through conductor 61' connected to contact maker 61, contact 47c, rotor 23, contact 47 and conductor 63 connected to one terminal of the coil 35' and conductors 64, 64" connected to the opposite terminal of the coil 35', circuit maker 65 and conductors 65', 55. The circuit maker 65 will contact the conductor member 53 for a sufficiently long period to permit rotation of the rotor, which rotates in the direction indicated by the arrow in Figure 17, until the circuit breaker or the non-conducting space 46 of the rotor moves below and contacts the contact 47c to thereby open the circuit. The resilient band 37 of the electromagnetic actuating means, upon the opening of the circuit instantly assumes a position under the expansive forces thereof to engage the flange of the rotor and thereby lock the rotor and the tuning means against movement.

It will be obvious that the resilient band 37, at each termination of rotation of the rotor, functions to lock the tuning element in any one of a plurality of tuning positions. The adjustment of the tuning means will be maintained for a fifteen minute period, and until the ball c' contacts the contact maker 60, when the coil 35 will be connected in circuit with the source of electric energy, except that the circuit will be established through the contact maker 60, conductor 60' and contact 47b, said circuit being opened by the non-conducting space 46 of the rotor passing below and contacting said contact 47b to effect a further preselected actuation of the tuning means. After a further successive fifteen minute interval the ball b' will contact the contact maker 59 and close the circuit of the coil 35 through said contact maker 59, the conductor 59' and contact 47a, said circuit being opened by the non-conducting space 46 of the rotor passing below and contacting said contact 47a. After a further successive fifteen minute interval a ball $a^2$ will contact the contact maker 58 again connecting the electromagnet C through the circuit described in connection with the source of electric energy and energizing the same thereby actuating the armature 71 and ratchet means 72, 72' to move the contact terminal 70 out of contact with a terminal 67 to position intermediate a pair of said terminals 69, the movement of the armature 71 actuating the contact 70 through an arc of 45 degrees and the contact terminals 67 being spaced apart 90 degrees.

It will be obvious that the actuation of the rotor 23 and tuning of the receiver is preselected by the adjustment of the contacts 47a, 47b and 47c relative to the non-conducting space of the rotor, and that the time of actuation of the rotor and adjustment of the tuning means is effected at predetermined intervals selected by the setting of the balls in the rows of openings in the disc 49. While actuation of the rotor and adjustment of the tuning means has been described as effected at successive fifteen minute intervals, adjustment of the tuning element may be maintained for such interval or multiples thereof. Also, while the balls a', $a^2$ have been set to open the power circuit after four fifteen minute intervals or one hour, said circuit may remain closed for any multiple of fifteen minute intervals up to a twelve hour interval, there being forty-eight openings in each row of openings representative of a twelve hour interval.

In Figure 19 there is illustrated a modification of the settable circuit closing means the ball circuit maker transporting disc 49 not being shown. In lieu of the conductor member 53 there is provided an annular member 79 of dielectric material having a series of annular members or rings e, f, g, h and i of electric conducting material seated in concentric recesses in the face of said member. The ball circuit makers inserted in the openings a, b, c and d in the disc 49 contact with and are transported relative to the rings e, f, g and h, respectively, by the rotation of said disc. The contact makers 58, 59, 60 and 61 are in the form of a comb 80 fixed upon a conductor member 81 mounted on the base block B. The conductors 59', 60' and 61' connected to the contacts 47a, 47b and 47c are connected to the rings f, g, h and the conductor 58' connected to one terminal of the coil of electromagnet C is connected to the ring e. The ball circuit makers transported by the disc 49 contact the rings e, f, g, h, and are thereby in permanent electric connection with one side of the coil of electromagnet C and contacts 47, 47a, 47b and 47c and circuit is established through any one of the balls and a tooth of the comb 80 and comb support 81. A circuit maker 65a is in electric connection with the comb support 81, as shown diagrammatically by a conductor 82, and the circuit maker 65a contacting the ring i connected to one side of the source of electric energy, the coil of the electromagnet C and the coil 35' of the electrically operated vibratable means to rotate the rotor 23.

In Figure 20 there is shown a modification of the contact makers 58, 59, 60 and 61, and showing in a diagrammatic manner the electric connections of the operative parts including circuit making means to open the circuit of an audio amplifier of a radio receiver during the tuning period, and showing manually selectively operative means to effect predetermined operation of the electrically operated means or motor and preselected tuning of the radio receiver and non-predetermined actuation of the electrically operated means or motor and of the tuning means and effect non-predetermined tuning of the radio receiver. Like parts and conductors shown in Figure 17 have been given the same reference characters in Figure 20. The contact makers adapted to be contacted by the circuit making balls in the rows of openings a, b, c and d in the disc 49 are in the form of members of conducting material 58a, 59a, 60a and 61a inserted into recesses in the face of and insulated from the conductor member 53, as at 83. The inserts are of less width than the recesses and a portion of the insulation is removed to provide a space between one side of the conductors and recesses, as clearly shown in Figure 21, and the inserts are disposed to intersect the travel of the circuit making balls as they are transported by the disc 49, whereby as the balls are transported relative to said spaces the ball circuit makers will contact with both the conductor 53 and the inserts.

The conductors 58', 59', 60' and 61' are connected to said inserts 58a, 59a, 60a and 61a, respectively, electrically connecting the insert 58a to one side of the electromagnet C and the conductors 59a, 60a and 61a to the contacts 47a, 47b and 47c, respectively. To assure the circuit making balls contacting both the conductor 53 and contact making inserts an electromagnet 84 is disposed below the conductor 53 in opposed relation to the conductor inserts, as shown in Figure 21. and the electromagnet is interposed in the conductor 65'. To open the circuit of an amplifier in a receiver circuit, shown diagrammatically at A, a circuit maker 85 in the amplifier circuit is carried by and insulated from a movable member 86 of conducting material supported to have movement toward and away from contact terminals in the amplifier circuit, said member 86 being in electrical connection with the conductor 56.

The member 86 is normally urged to position to close the amplifier circuit and is actuated to open said circuit by an electromagnet or relay 87 to which said member 86 serves as armature. One terminal of said electromagnet 87 is electrically connected to conductor 70' and the other terminal connected to contact 47 by a conductor 88 and a circuit established through said conductor when a circuit is established through one of the contacts 47a or 47b or 47c. When the electromagnet is energized the member 86 is actuated to open the circuit of the audio amplifier by moving the contact carried by the member 86 into contact with a contact terminal, as at 89, of a conductor 90 connected to a binding post 91 electrically connected by conductor 92 to one terminal of the coil 35' of the electromagnetically operated means for actuating the rotor 23, the other terminal of said coil 35' being connected by conductor 93 to binding posts 94 connected by a lead 95 to the conductor L and negative side of the source of electric energy. When a circuit is established through the settable circuit closing means the switch is actuated to close and open the power circuit of the radio apparatus as described in connection with Figure 17, and a circuit is established through the electrically operated means for the rotor through one of the contacts 47ª or 47ᵇ, 47ᶜ which is opened by the electric circuit breaker or non-conducting space 46 contacting the contact through which the circuit is closed and when such circuit is established the electromagnet 87 is energized and actuates the armature 86 to open the circuit of the audio amplifier.

To selectively manually close a circuit through one of the contacts 47ª, 47ᵇ or 47ᶜ and effect preselected tuning a series of manually operated circuit makers 98, 98ª, 98ᵇ, 98ᶜ, which may be in the form of buttons, are provided, the contacts 98ª, 98ᵇ and 98ᶜ being connected to the contacts 47ª, 47ᵇ and 47ᶜ, respectively. The conductor member 99 is common to all of said circuit makers and is connected by lead 100 to the conductor L. This manually selective closing of a circuit of the electromagnetically operated means may be operated while in electrical connection with the settable circuit closing means and while the switch S is actuated to position with the contact terminal 70 in contact with a contact terminal 69. As one of the circuit makers 98ª, 98ᵇ or 98ᶜ is actuated, for instance, circuit maker 98ª, a circuit is established through conductor 59', contact 47ª, through conductor 23, conductor 88 to the electromagnet 87, through conductor 70' connected to the other terminal of the electromagnet 87, contact terminals 67, 70 and conductor 56 to armature 86, circuit closer 89, conductor 90, 92, to one terminal of the coil 35' of the electromagnetically operated means, and from the other terminal of said coil 35' through conductors 93, 95 and 100 and circuit maker 99. The establishment of the circuit energizes the electromagnet 87 to actuate the armature 86 and open the circuit of the audio amplifier A and said circuit is opened by the non-conducting space 46 of the rotor 23 passing below and contacting the contact 47ª. By actuating the circuit makers 98ᵇ or 98ᶜ to circuit closing position the circuit is established through the contacts 47ᵇ or 47ᶜ and after the preselected adjustment of the tuning means the circuit is opened by the electric circuit breaker or non-conducting space 46 of the rotor contacting the contact through which the circuit was closed.

To effect energization and de-energization of the electrically operated means for the rotor and non-predetermined actuation of the rotor and non-predetermined actuation of the tuning means and the opening and closing of the power circuit of the radio receiver, the circuit of the selectively settable circuit closing means is opened by the actuation of a switch 102 interposed in the conductor 65'. Should the power circuit of the radio receiver be open, the circuit closer 98 is actuated into contact with the conductor 99 connected by conductors 100, L to one side of the source of electric energy, and through conductors 101, 58' connected to one terminal of the coil of the electromagnet C and conductors 58'', 56 connected to the opposite terminal of said coil, thereby energizing said electromagnet and actuating the contact terminal 70 into contact with a contact terminal 67 and establishing a circuit through conductors 69, 70'. The circuit of the coil 35' of the electromagnetically operated means is then closed by manually actuating the circuit maker 98ᵈ into contact with the conductor 99 connected by conductor L leading to the negative side of the source of electric energy, and through a lead or conductor 98ᵉ connected to circuit maker 98ᵈ and the contact 47ᵈ contacting the rotor conductor member 23, through said conductor 23, contact 47, conductor 88 to one terminal of relay 87, through conductor 70' connected to the opposite terminal of said relay, through contact terminals 67, 70, conductor 67' and to conductor L' leading from the positive side of the source of electric energy. The energizing of the relay 87 attracts thereto the member 86 connected to conductor L', opening the circuit of the audio amplifier A and closing the circuit of the coil 35' of the electromagnetically operated means through conductor 90, 92 connected to one terminal of said coil, and conductor 93, 95 connected to the other terminal of coil 35' and connected to conductor L. The contacts 47ᵈ and 47 contacting the rotor conductor member 23 are positioned so they will not co-act with the electric circuit breaker or non-conducting space 46 and open the circuit of the electrically operated means. Thus the circuit of the electrically operated means can be and is closed and opened by the manually operated circuit closer 98ᵈ wholly independently of the adjustable contacts and the electric circuit breaker or space 46 and the electrically operated means for the rotor is thereby energized and de-energized at will to thereby actuate and stop the rotor and mechanism at any time and in any position.

It will be clear that the circuit of the electrically operated means for the rotor 23 could be connected with and closed directly by the source of electric energy, and not through the contacts 47, 47ᵉ and rotor 23 as shown, by modifying the electric circuit for circuit closer 98ᵈ and the electrically operated means by the obvious and simple expedient of connecting wire L' from the source of electric energy with wire 92 and the coil 35' and by connecting coil 35' and wire 92 with wire 98ᵉ and closer 98ᵈ. It will be clear, therefore, that contacts 47, 47ᵉ and conductor 23 do not constitute an indispensable part of the electric circuit for the non-selective or independent energization and de-energization of the electrically operated means and actuation of the rotor 23 and mechanism by means of the circuit closer 98ᵈ.

Having described my invention, I claim:

1. In means for actuating and controlling the actuation of a mechanism including a rotatable shaft, a peripherally flanged disk member of electric conducting material loosely mounted on said shaft and having a non-conducting space in the face thereof, means normally coupling said disk member to the shaft and operative to release the disk member from and manually rotate the shaft independently of said disk member, a resilient contractile and expansible band normally engaging the flange of and holding said disk member and shaft against movement under the expansive force of said band, electrically operated means to contract the band out of engagement with the disk flange and impart slight endwise movement to the band in one direction and expand said band into engagement with the disk flange and impart slight endwise movement in the opposite direction to the band and transmit said endwise movements of the band to rotative movement of the disk member in one direction, means to connect said disk member in a plurality of circuits with the electrically operated means, including contacts selectively adjustable about and contacting the disk member, and switch means operative to close and selectively include one of said contacts with the disk member in circuit with the electrically operated band contracting and expanding means, and said circuit adapted to be opened by the non-conducting space of the disk member contacting the contact through which the circuit is closed by the rotation of the disk member and actuation of the mechanism to predetermined position.

2. In a mechanism actuator and controller, a rotor, a flange connected to said rotor, a circuit-breaking element associated with said rotor, a split spring-like band having opposed ends, said band normally frictionally engaging the inner surface of said flange to hold said rotor against movement by the expansive forces of said band, electromagnetic means connnected to said band and mounted on said rotor for contracting and expanding said band and imparting endwise movements thereto to thereby rotate said rotor, means including selectively adjustable contacts engaging said rotor for connecting said rotor in each of a plurality of circuits with the aforesaid electromagnetic means and a switch operative to close and selectively include one of said contacts with said rotor in circuit with said band, said circuit being adapted to be opened by engagement of the aforesaid circuit-breaking element with the contact through which the circuit is closed by rotation of the rotor to predetermined position.

3. In a mechanism actuator and controller, a flanged rotor connected to the mechanism, a split expansible and contractible band normally engaging the inner surface of the rotor flange to hold the rotor against rotation by the expansive forces of said band, electromagnetic means mounted on said rotor, vibratable means connected to said band and disposed internally of the flange of the rotor and connected to and actuated by said electromagnetic means for contracting and expanding and imparting endwise displaced movements to said band to rotate said rotor and actuate the mechanism, a source of current supply, selectively settable means electrically connected to said electromagnetic means and normally in open circuit with said source of current supply, selectively operative means for closing the circuit to energize the electromagnetic means and means for automatically opening the circuit to render the electromagnetic means inactive to thereby cause the band to lock the rotor against movement at positions predetermined by said settable means.

4. In a mechanism actuator and controller, a flanged rotor connected to the mechanism, a resilient expansible and contractible locking and driving member normally engaging said flange for frictionally locking the rotor against rotation, electrical actuating means mounted on said rotor interiorly of said locking and driving member, a vibratory element actuated by said electrical actuating means, connecting means between said vibratory element and said locking and driving member to impart rotary movements to said latter member synchronously with the vibrations of said vibratory element and thereby effect rotation of said rotor and actuation of the mechanism, selectively settable means connected in and normally opening the circuit of said electrical actuating means, selectively operative circuit closing means to predeterminedly close the circuit for energizing the electrical actuating means to vibrate the vibratory element and means for selectively opening the circuit to render the electrical actuating means inactive and to permit automatic expansion of said locking and driving member into locked position with said flange after partial rotation of said rotor to predetermined position.

5. In a mechanism actuator and controller, a peripherally flanged rotor and conductor member connected to the mechanism to be actuated, a displaceable resilient expansible and contractile band normally engaging the inner peripheral surface of the rotor flange and holding the rotor against rotation by its expansive forces, electromagnetic means, vibratable means connected to said electromagnetic means and disposed internally of the flange of said rotor and vibrated by said electromagnetic means to transmit the vibrations thereof into contracting, expanding and endwise displaced movements of said band and thereby rotate the rotor and actuate the mechanism, selectively settable means connected with said electromagnetic means in normally open circuit with a source of electrical energy, selectively operative means to close the circuit of and render said electromagnetic means active and automatically operated means for opening said circuit to render said elecromagnetic means inactive whereby said band will lock said rotor and mechanism against movement at positions predetermined by said settable means.

6. In a mechanism actuator and controller, a rotatable cup-shaped flanged rotor and conductor member adapted for connection to the mechanism to be actuated, an electric circuit breaker embodied in said rotor, a displaceable resilient contractile and expansible band disposed internally of said cup-shaped rotor and normally operative under the expansive forces thereof to engage the inner peripheral surface of said flange and hold the rotor against movement, a vibratable member disposed internally of the flange of the rotor and connected with the band to vibratably contract and expand and displace said band and thereby effect rotary movement of the rotor and actuation of the mechanism, an electromagnet disposed internally of the band and adapted to be energized by alternating electric current and vibrate the vibratable member synchronously with the pulsations of said current, selectively settable means connected in and normally opening the circuit of said electromagnet, selectively operative circuit closing means to predeterminedly close said circuit and energize the electromagnet and means to selectively open the circuit and render said electromagnet inactive and permit expansion of said band into engagement with the flange of the rotor to automatically lock the rotor and mechanism against movement after partial rotation of said rotor to predetermined position.

7. In a mechanism actuator and controller, a rotatable peripherally flanged cup-shaped rotor and conductor member adapted for connection to the mechanism to be actuated, a non-conducting electric circuit-breaking element on said rotor, a displaceable contractile and expansible split band of resilient material mounted within the flanged rotor and yieldingly anchored at one end with the other end free, said band being adapted to expand and engage the flange of and hold said rotor against rotation, a source of pulsating electric current, an electromagnet in circuit with said source of current and disposed interiorly of said rotor and band, a vibratable armature for said electromagnet and vibratable upon the energization of the electromagnet to contract, expand and displace said band by endwise movements and synchronously with the pulsations of said electric current and selectively operable circuit closing and opening means including preselective settable contacts contacting the rotor conductor to close the normally open circuit of the electromagnet and to open said circuit after rotation of the rotor a predetermined distance by engagement of the preselected contact through which the circuit is closed with the aforesaid circuit-breaking element.

8. In a mechanism actuator and controller, a rotatable peripherally flanged cup-shaped rotor and conductor member connected to and operative to actuate the mechanism, electric circuit-breaking means associated with said rotor, a vibratable displaceable contractile and expansible band disposed internally of the cup-shaped rotor and normally expanded into engagement with the inner surface of said flange to detachably lock the rotor and mechanism against movement, a source of current supply, electrically operated means normally in open circuit therewith and connected to and operative to impart contracting and expanding and displaced endwise movements to the internally disposed band to thereby rotate the rotor and actuate the mechanism, means to selectively close and open the circuit of the electrically operated means including selective contacts contacting said conductor member in pre-adjusted relation to the aforesaid circuit-breaking means, selectively operable circuit closing means to close the circuit through a selected contact and the conductor member to actuate the band and operate the rotor and mechanism to positions predetermined by the co-action of said adjusted contact with the circuit breaking means and manually operable means to close and open the circuit of the electrically operated means independently of the adjustable contacts and circuit breaking means.

9. In a mechanism actuator and controller, a peripherally flanged cup-shaped rotor adapted to actuate the mechanism, a vibratably displaceable resilient contractile and expansible band disposed internally of the cup-shaped rotor and resiliently anchored at one end and normally expanded to engage the inner surface of the flange of said rotor to hold said rotor and mechanism against movement, an electromagnet and a vibratable armature therefor operatively connected with the free end of said band and disposed internally of the rotor and band and operable upon energization of said electromagnet to vibrate and contract and expand and endwise displace the band into and out of engagement with the inner surface of said flange and thereby transmit said contracting and expanding and displaced movements of the band into rotary movement of the rotor and consequent actuation of the mechanism, a source of current supply in a normally open circuit with said electromagnet and means to close said circuit and render the electromagnet active and vibratably displace said band and effect non-predetermined actuation of the rotor and mechanism and to open said circuit and render the electromagnet inactive to permit expansion of said band into engagement with the flange of the rotor and hold the rotor and mechanism against movement.

10. In a mechanism actuator and controller, a peripherally flanged rotor and conductor member, a dielectric circuit breaking insert in the face of said member, a dial, selectively settable contacts mounted on said dial and contacting the conductor member in prearranged spaced relation to said insert, a yieldingly anchored contractile and expansible band of resilient material disposed internally of and normaly in expanded engagement with the flange of the rotor, an electromagnet, a vibratable armature therefor disposed internally of the flange of said rotor and band and operatively connected with the free end of the band to vibrate and contract, expand and endwise displace the band into and out of engagement with the rotor flange and thereby actuate said rotor and mechanism, a source of current supply in open circuit with said electromagnet and means operable to selectively close said circuit through a selected one of said contacts and the conductor member, the contact so selected being adapted to engage said insert to selectively open said circuit and selectively control the energization and deenergization of said electromagnet.

11. In a mechanism actuator and controller, a rotatable shaft, a peripherally flanged cup-shaped rotor and conductor member connected to and rotatable with said shaft, electric circuit-breaking means embodied with said rotor, a displaceable resilient expansible and contractile band yieldingly anchored internally of the flange of said rotor and normally expanded to internally engage said flange and hold the shaft and rotor against rotation, electrically operated means disposed internally of the flange of the rotor and said band and connected with and adapted to intermittently contract the band out of engagement with the rotor flange and to impart endwise displacement of the band in one direction as well as to expand the band into internal engagement with said flange and impart endwise displacement of the band in the opposite direction to thereby rotate the rotor and actuate the mechanism and selectively operable means including selectively settable contacts associated with said rotor and operable for connection to said electrically operated means in a plurality of normally open circuits whereby the circuit through the electrically operated means and rotor may be opened and closed through one of said selective contacts to thereby actuate and stop the rotor and mechanism in any one of a plurality of predetermined positions.

12. In a mechanism actuator and controller, a rotor, a flange connected thereto, a circuit-breaking element on said rotor, a contractible and expansible band normally frictionally engaging the inner surface of the flange of said rotor to hold said rotor against movement by the expansive forces of said band, electromagnetic means connected to said band and mounted on said rotor interiorly of said band and adapted to contract and expand said band and impart endwise movemets thereto to thereby rotate said rotor, means for connecting said rotor in each of a plurality of circuits with the aforesaid electromagnetic means and including selectively adjustable contacts engaging said rotor and adjustable circularly with respect to said circuit-breaking element to permit of the adjustment of their initial relative distance therefrom and means operative to close and selectively include one of said contacts with said rotor in circuit with said electromagnetic means, said circuit being adapted to be opened by engagement of the aforesaid circuit-breaking element with the contact through which the circuit is closed by rotation of the rotor to predetermined position.

13. In a mechanism actuator and controller, a rotor, a flange connected thereto, a circuit-breaking element on said rotor, a contractible and expansible band normally frictionally engaging the inner surface of the flange of said rotor to hold said rotor against movement by the expansive forces of said band, electromagnetic means mounted on said rotor interiorly of said band and adapted to contract and expand said band and impart endwise movements thereto to thereby rotate said rotor, a support disposed concentrically of said rotor and provided with indicia thereon, means for connecting said rotor in each of a plurality of circuits with the aforesaid electromagnetic means and including selectively adjustable contacts mounted on said support and engaging said rotor and adjustable circularly with respect to said circuit-breaking element to permit of the adjustment of their initial relative distance therefrom and adapted to be brought into registry with the indicia on said support to indicate the adjusted and preselected positions of said contacts and means operative to close and selectively include one of said contacts with said rotor in circuit with said electromagnetic means, said circuit being adapted to be opened by engagement of the aforesaid circuit-breaking element with the contact through which the circuit is closed by rotation of the rotor to predetermined position.

14. In a mechanism actuator and controller, a peripherally flanged cup-shaped rotor, a circuit breaking element associated therewith, a displaceable resilient expansible and contractible band normally expanded against the inner surface of the rotor flange to hold the rotor against rotation, electrically operated means disposed internally of the flange of the rotor and connected with and adapted to intermittently contract said band out of engagement with the rotor flange to impart endwise displacement of said band in one direction as well as to expand said band into engagement with said flange and to impart endwise displacement of said band in the opposite direction to thereby rotate the rotor and actuate the mechanism, selectively operable means including selectively settable contacts associated with said rotor and operable for connection to said electrically operated means in a plurality of normally open circuits whereby the circuit through the electrically operative means and rotor may be opened and closed from one of said selected contacts to thereby actuate and stop the rotor and mechanism in any one of a plurality of predetermined positions and means included in the selectively operable means for closing and opening the circuit of the electrically operated means independently of the aforesaid settable contacts for rotation of said rotor and mechanism.

MERION J. HUGGINS.